(12) United States Patent
Müller et al.

(10) Patent No.: US 7,924,582 B2
(45) Date of Patent: Apr. 12, 2011

(54) SWITCHING DEVICE AND METHOD, IN PARTICULAR FOR PHOTOVOLTAIC GENERATORS

(75) Inventors: Burkhard Müller, Kassel (DE); Frank Greizer, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 541 days.

(21) Appl. No.: 11/904,404

(22) Filed: Sep. 27, 2007

(65) Prior Publication Data

US 2008/0094867 A1  Apr. 24, 2008

(30) Foreign Application Priority Data

Oct. 21, 2006 (EP) .................................... 06022110

(51) Int. Cl.
*H02H 7/122* (2006.01)
(52) U.S. Cl. ..................................... 363/56.05; 323/906
(58) Field of Classification Search ............... 363/50, 363/55, 56.01–56.05, 56.09–56.11; 361/18, 361/21, 56; 323/906
See application file for complete search history.

(56) References Cited

U.S. PATENT DOCUMENTS

| 4,691,159 | A | * | 9/1987 | Ahrens et al. | ................ | 323/222 |
| 4,761,722 | A | | 8/1988 | Pruitt | | |
| 6,549,441 | B1 | * | 4/2003 | Aigner et al. | ................ | 363/142 |
| 6,611,441 | B2 | * | 8/2003 | Kurokami et al. | ......... | 363/56.02 |
| 2001/0054881 | A1 | | 12/2001 | Watanabe | | |
| 2005/0105224 | A1 | * | 5/2005 | Nishi | ............... | 361/18 |

FOREIGN PATENT DOCUMENTS

| DE | 2630597 | 1/1977 |
| DE | 3725476 | 2/1989 |
| DE | 4041672 | 6/1992 |
| DE | 4102069 | 7/1992 |
| DE | 4325436 | 2/1995 |
| DE | 10312921 | 10/2004 |
| EP | 1039621 | 9/2000 |
| JP | 7241077 | 9/1995 |
| JP | 11312022 | 11/2000 |
| JP | 2005070709 | 3/2004 |
| JP | 2004254447 | 9/2004 |
| JP | 2006238629 | 9/2006 |

\* cited by examiner

*Primary Examiner* — Harry Behm
*Assistant Examiner* — Matthew Grubb
(74) *Attorney, Agent, or Firm* — Eschweiler & Associates, LLC

(57) ABSTRACT

The subject matter of the invention is an inverter (3), more specifically for use in a photovoltaic plant (1) with a direct voltage input (connection terminals 4; 5) for connection to a generator (2) and an alternating voltage output (connection terminals 7; 8) for feeding into an energy supply network (6) as well as with a DC-AC converter (12) with semiconductor switch elements (15) and an intermediate circuit (11), at least one short-circuit switch element (18) being connected in parallel to the generator (2), so that the voltage will not exceed a maximum voltage value neither at the connection terminals (4; 5) of the generator (2) nor between the connection terminals (9; 10) of the inverter. This is achieved in that the inverter (3) comprises, in the intermediate circuit (12), a buffer capacitor (14) that is connected to the generator (2) through a protection diode (17) so that said buffer capacitor (14) will not be discharged upon actuation of the short-circuit switch element (18), the generator (2) working according to a clock rate in the short-circuit mode of operation.

2 Claims, 4 Drawing Sheets

SWITCHING DEVICE AND METHOD, IN PARTICULAR FOR PHOTOVOLTAIC GENERATORS

FIELD OF THE INVENTION

The invention relates to an inverter, in particular for use in a photovoltaic plant with a direct voltage input for a photovoltaic generator and with an alternating voltage output for feeding for example into an energy supply network as well as with a DC-AC converter with semiconductor switch elements, as well as to a method for overvoltage protection, in particular of a photovoltaic plant with an inverter of the invention.

BACKGROUND OF THE INVENTION

Photovoltaic plants for generating electric power include a solar inverter comprising for example a semiconductor bridge converting the direct voltage generated by a solar generator into an alternating voltage.

In the solar inverters, when the bridge is being synchronized, the full voltage of the solar generator is applied to the individual semiconductors. When the solar inverter is ideally fed without interruption over the entire day, the semiconductors could be set to a voltage referred to as an MPP voltage (Maximum Power Point) of the solar generator. The MPP voltage is the voltage at a power peak of the generator characteristic. Often however, the supply is disrupted because of mains failure or of other reasons. In order for the solar inverter to be capable of resuming operation after such interruptions, it must be synchronized at the idle voltage of the generator, which in this case is also applied at the individual semiconductors. Depending on the type of the generator, this idle voltage may exceed the MPP voltage by 25% and more. Therefore, the individual semiconductors must be devised for this significantly higher voltage. However, higher voltage semiconductors involve higher conduction losses and, as a result thereof, reduced efficiency of the inverter. If the inverter also comprises a buffer capacitor, the latter must also be devised for a higher voltage. The buffer capacitor is not only larger; it also is significantly more expensive.

Existing mounting regulations often only allow for determined maximum voltages. In the US for example, the solar plants are not allowed to have a voltage in excess of 600 V. Since breakdowns can never be excluded during supply, the generators of solar plants are generally dimensioned so that their idle voltage will not exceed the threshold of 600 V.

The document DE-A-40 41 672 shows and describes a protection device with a monitoring equipment for voltage increase due to failures for photovoltaic power generating plants, a current flow being interrupted by a line segment. The protection device comprises a short-circuit current circuit with an electrically actuatable switch.

In another document, namely the document JP 2004 254447 A, there is disclosed an inverter for a photovoltaic generator. There is provided that the DC side be short-circuited. A buffer capacitor is thereby provided on the DC side, as well as three diodes. The diodes are disposed directly behind the generator so that the buffer capacitor is immediately discharged when the DC side is short-circuited.

The document JP 2004 070709 A describes a protection circuit with a shorted circuit. A shunt is inserted to limit the voltage.

From the document DE 37 25 476 A1 there is also known a circuit arrangement for feeding an electric load from an electric power source with fluctuating efficiency. The circuit arrangement serves to feed an electric load from a solar generator. A capacitor 2 is located parallel to the solar generator. The control is such that, when the voltages are less than a prescribed minimum value, which is needed for secure operation of the supply apparatus, an initial load is connected to the solar generator and that, when the voltages increase over prescribed minimum value, an auxiliary voltage input of the supply apparatus is connected to the solar generator.

The printed document JP 11 312022 A shows and describes an inverter that is intended to be utilized for photovoltaic generators. The circuit comprises a coil, a switch element for short-circuiting the coil, a diode and behind the diode a capacitor. There is further provided a chopper circuit the function of which is to be discontinued when the generator voltages are too high.

A photovoltaic power generator apparatus for protecting a power inverter against overvoltage is known from the document EP 1 039 621 B1. In this system, a direct current of the solar generator is converted into an alternating current. The document discusses the issue that a conventional power inverter will not start immediately upon receiving power generated in the solar cell apparatus but only after a predetermined length of time after the output from the solar cell apparatus has been checked. This is carried out because self-testing of the power inverter takes a certain time. Since the conventional power inverter starts later as a result thereof, the open voltage at the solar generator increases. As a result, the semiconductors of the conventional power inverter must be devised for a voltage that is higher than the operating voltage. The result is a poorer operating efficiency. Therefore, the document EP 1 039 621 B1 suggests a circuit that comprises a switch element with a compensating resistor. This is intended to prevent the voltage from increasing. The compensating resistor in the circuit is set so that the generator voltage will not exceed the maximum operating voltage of the power inverter so that the semiconductors of the power inverter only need to be set to the maximum operating voltage. The circuit comprises a plurality of transistors, the compensating resistor being connected in parallel with one of the transistors. According to the document EP 1 039 621 B1, a parallel branch is virtually connected to the generator, said parallel branch tapping a defined working current from the generator, thus preventing idle voltage from occurring at the generator terminals. This branch is only shut down when a certain minimum current is tapped by the inverter, thus ensuring that the idle voltage will no longer be achieved, without the help of the additional branch either. The disadvantage of this method however is that the transverse branch remains active for a while when the power supplied is small so that there is power, which is not used. Further, the transverse branch must be well tuned to the connected solar generator in order to efficiently limit the voltage. If an inverter is intended to work flexibly with different types of modules and string currents, the transverse branch must always be set to the maximum current that it is possible to achieve, this involving that the losses were to even further increase. If the inverter is to resume operation after a failure, the compensating resistor must even be set to the full power of the photovoltaic generator.

From the DE 103 12 921 A1 there is known a circuit arrangement for using a direct voltage generated by at least one solar generator. The circuit arrangement comprises a capacitor and an inverter circuit connected downstream of the capacitor. With this circuit arrangement, it is possible to use commercially available inverters with potential isolation also for thin-film solar cells and to thus achieve improved efficiency. With this solution, a switch element is connected upstream of the capacitor. The switch element is connected in series with the generator and with a semiconductor bridge between the generator and the semiconductor bridge. The circuit arrangement is responsible for opening the switch element when a defined first generator voltage of the solar generator is exceeded and for switching on the switch element when the voltage falls below the first generator voltage or below a second generator voltage that is lower than the first generator voltage so that the input voltage range possible for the inverter circuit is increased.

In this circuit, when the intermediate circuit voltage exceeds a certain threshold value, the generator is isolated from the intermediate circuit by an additional power switch, so that the intermediate circuit and the generator only need to be set to the set threshold and semiconductors having small conduction losses may be used. Since the isolation is cancelled when the voltage falls below a second, lower voltage threshold value, the inverter remains virtually synchronized with the generator to which it is connected and can resume operation at the issue of a failure. This principle solves the problem described herein above consisting in having to devise individual semiconductors for a significantly higher voltage since the inverter needs to be connected to the idle voltage of the generator after mains failure or interruption. The circuit however does not solve the special problem consisting in that, due to installation regulations, maximum voltages must be observed in some countries, so for example 600 volt in the USA. With the circuit proposed, the idle voltage is applied to the generator each time an isolation is carried out.

BRIEF SUMMARY OF THE INVENTION

According to one embodiment the subject matter of the invention is an inverter, more specifically for connecting to a photovoltaic plant with a direct voltage input for a photovoltaic generator and an alternate voltage mains output as well as with an inverter bridge comprising semiconductor switch elements with at least one buffer capacitor, and at least one short-circuit switch element being connected in parallel with the photovoltaic generator. In one embodiment the short-circuit switch element is configured so that, when a voltage threshold is exceeded, it is switched so that the photovoltaic generator is switched to a short-circuit mode of operation. In addition, when the voltage drops below the voltage threshold, the switch element is switched on again for the photovoltaic generator to quit the short-circuit mode of operation.

In addition, there is provided, in accordance with the invention, that the inverter having a buffer capacitor is connected to the photovoltaic generator through a protection diode so that the buffer capacitor will not be discharged when the short-circuit switch element is actuated. The voltage at the buffer capacitor is measured. If this voltage exceeds a prescribed threshold value, the switch element of the invention of the power switch is switched on. If the voltage is slightly lower, the power switch is switched off again. In an alternative implementation, the voltage measurement can be integrated into an appropriate regulating circuit that actuates the power switch. As a result, work voltage is always applied to the inverter so that the latter can resume operation even after breakdown.

The invention not only relates to the use of such an inverter for photovoltaic plants, but also for other current generators such as biogas plants, combined heat and power plants, and so on, even if reference will be made herein after to photovoltaic plants only.

Other advantageous features concerning the design of the inverter will appear from the subordinate claims.

The invention relies on the idea that, if it were possible to limit the generators to their MPP voltage, more modules could be connected in series without infringing the critical threshold. This would increase the flexibility in planning the plant and reduce the number of strings to be regulated.

As a result, the solution in accordance with the invention is characterized in that the voltage is limited to the maximum working voltage of the inverter both at the photovoltaic generator and at the input of the inverter and that the idle voltage of the photovoltaic generator is kept away from the inverter input and, as a result thereof, from its semiconductor switches, the inverter remaining synchronized with the solar generator to which it is connected in order to allow for ready start in the morning and for re-start after a breakdown.

Therefore, at least one short-circuit switch element is connected in parallel with the photovoltaic generator, said short-circuit switch element being actuatable in such a manner that, when a voltage threshold is exceeded, it is switched so that the photovoltaic generator is switched to a short-circuit mode of operation and that, when the voltage drops below the voltage threshold, the switch element is switched off again for the photovoltaic generator to quit the short-circuit mode of operation. This makes it possible not only to solve the re-start issue but also to meet the regulations in countries like the USA. Controllers other than the two-position controller described can be used, so for example P-controller, PI-controllers or PID-controllers.

In one embodiment, the invention comprises arranging a switch to be switched on and off by a control signal, more specifically a power switch, in parallel to the photovoltaic generator and to operate it in a synchronization allowing for keeping the input voltage of the inverter ina defined voltage range below the idle voltage of the generator.

It is particularly advantageous if the short-circuit switch element is a semiconductor switch, more specifically a transistor or a turn-off thyristor. This makes it possible to quickly correct the input voltage of the inverter.

One implementation of the invention involves the saving of an additional component or switch element, said implementation comprising the short-circuit switch element as a transistor of a boost chopper of the inverter. As a result, two circuit structure functions are assumed. The result is an elegant simplification of the circuit and less loss.

If the solar generator has significant capacitance or if the input capacitance thereof is disposed upstream of the power switch as a result of integrating the circuit in a boost chopper, the existing capacitance must be discharged each time the power switch is switched on. In order for the power switch not to have to convert the energy contained into heat or not to have to convert it completely, various other implementations of the invention are possible.

Therefore, in one embodiment of the invention, a load resistor is arranged in series with the short-circuit switch element. The load resistor, which is connected in series to the switch element, converts the energy content of the capacitance into heat. Optionally, a short-circuit switch element without a load resistor can be connected in parallel to one or several power switches with a load resistor, the short-circuit switch element being only switched on after the greatest part of the energy stored has been converted into heat.

In an alternative embodiment, an inductance can be inserted between the solar generator and the short-circuit switch element. When the short-circuit switch element is being switched on, this inductance then absorbs at least part of the energy contained in the capacitance. In one embodiment of the invention, such an inductance is provided and used to operate the short-circuit switch element in a current-limited mode of operation. For this purpose, this short-circuit switch element is switched off when the current intensity has reached a determined value that is clearly in excess of the normal generator current, and is switched on again at a certain clock rate, or after the current intensity has dropped below a given, lower current intensity. If, in the intermediate circuit, there is provided at the same time a buffer capacitor with a diode mounted upstream thereof, the particular advantage obtained is that the energy content of the input capacitance is transferred through the boost chopper principle into the buffer capacitors of the inverter and needs not be converted into heat. As a result, there is a high tolerance of the circuit with respect to the magnitude of the input capacitance. In principle, it is also possible to combine resistor and inductance.

Other advantageous implementations of the invention, not only with respect to the inverter but also concerning the method, are described in the subordinate claims.

An exemplary embodiment will be explained in greater detail with respect to the drawings and further advantageous developed implementations of the invention and advantages thereof will be described.

In said drawings:

DETAILED DESCRIPTION OF THE INVENTION

In the Figs., like elements are labelled with the same numerals.

Figure 1:
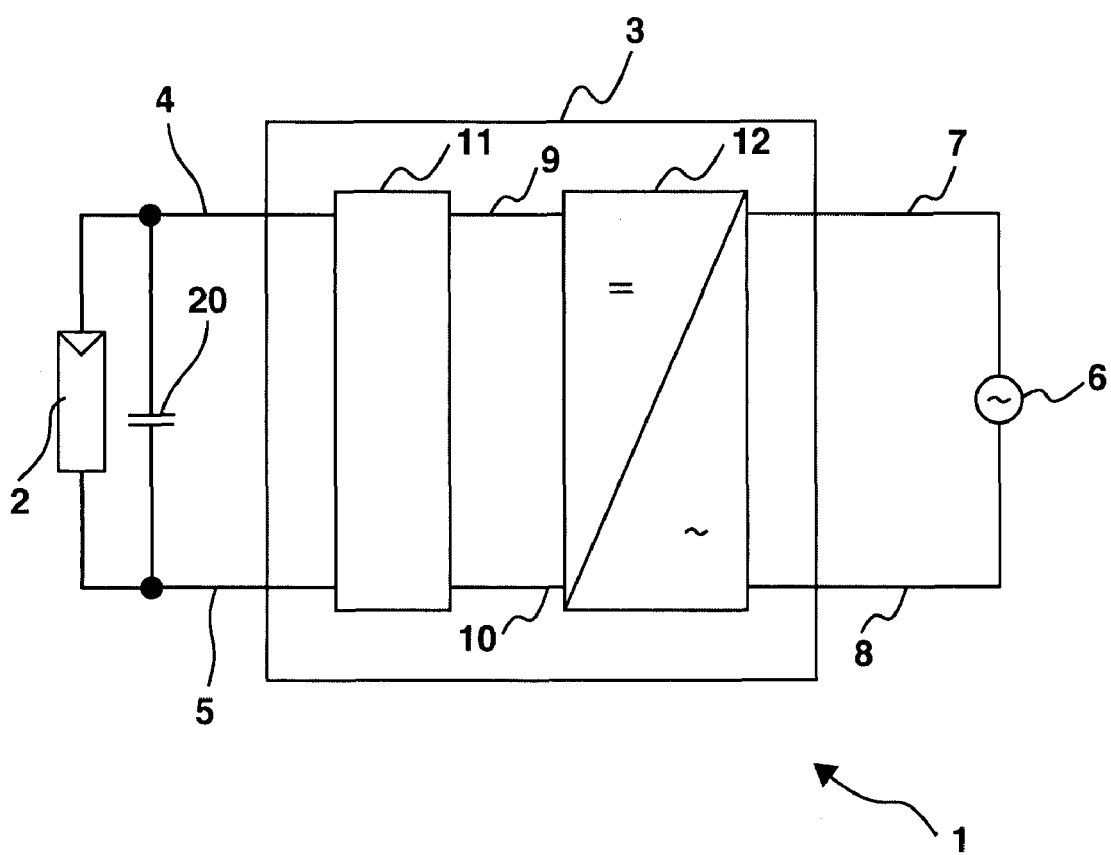
FIG. 1 shows a schematic representation of a photovoltaic plant with a generator and an inverter of the invention that is connected to a power supply network (state of the art)

FIG. 1 illustrates a photovoltaic plant 1. It comprises a generator 2 that is implemented as a photovoltaic generator. It may consist of several modules. Here however, only one is shown. The photovoltaic generator 2 is connected to an inverter 3 through connection terminals 4, 5. A direct voltage is applied to the terminals 4, 5. The inverter 3, which consists of an intermediate circuit 11 and of a DC-AC converter 12, is connected to a power supply network 6, more specifically to a low-voltage network. The connection terminals 7, 8 serve as an alternating voltage network output. The intermediate circuit 11 and the DC-AC converter 12 are connected together through the connection terminals 9 and 10. The photovoltaic generator 2 has an internal capacitance that is shown as the capacitor 20. The DC-AC converter 12 may for example be implemented as a DC-DC-AC converter.

Figure 2:
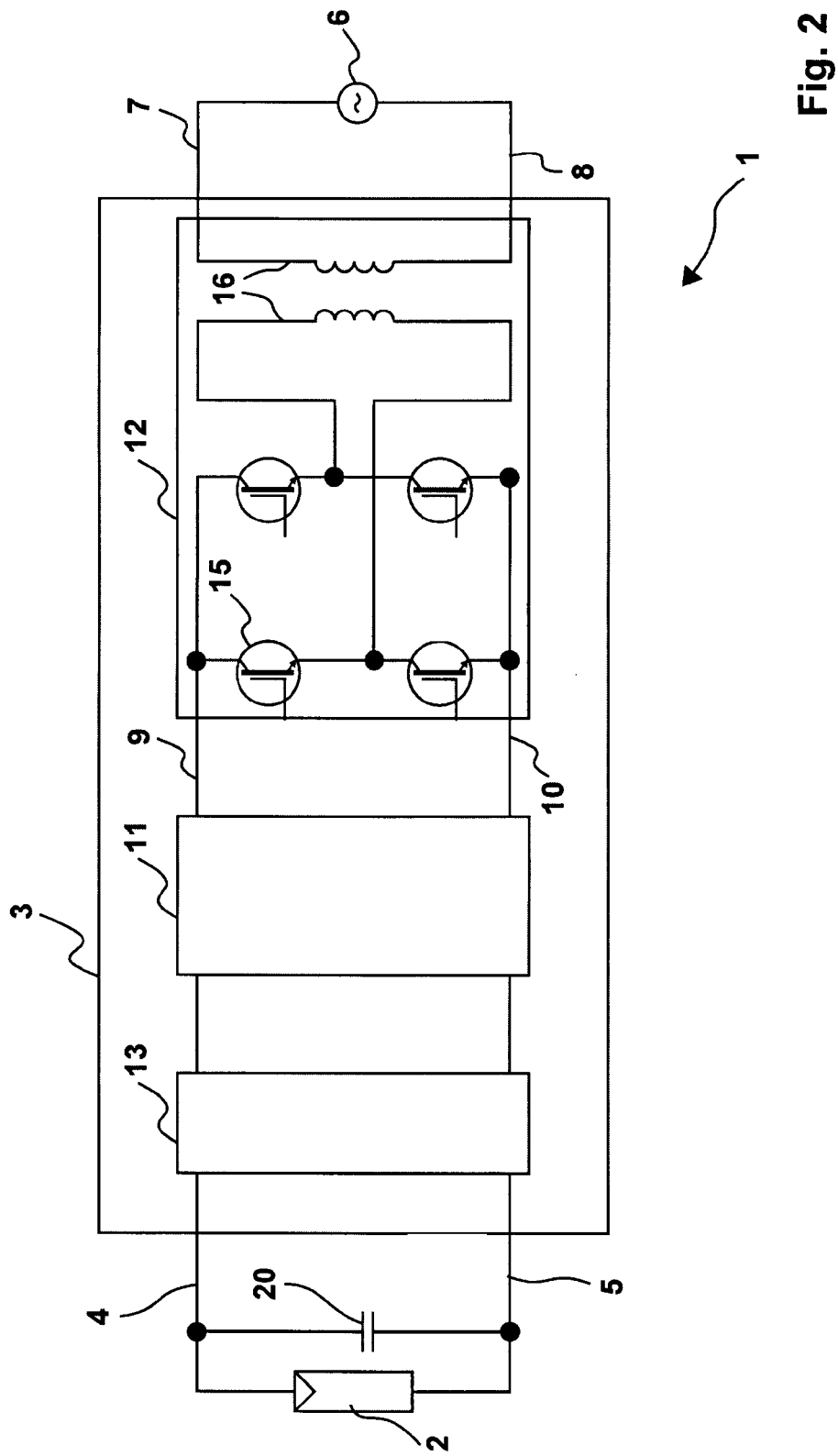
FIG. 2 shows a schematic representation of a photovoltaic plant with a generator and an inverter of the invention with an intermediate circuit and a DC-AC converter in the form of a bridge circuit with a transformer connected, downstream thereof, to a power supply network.

FIG. 2 shows a photovoltaic plant 1 with an inverter 3 of the invention. The inverter 3 consists of a voltage limiting circuit 13 of the invention that is connected through the connection terminals 4 and 5 to the photovoltaic generator 2 and that is connected upstream of the intermediate circuit 11. The DC-AC converter 12 is implemented here as a full bridge with semiconductor components 15 and a transformer 16, more specifically a 50 Hz-60 Hz transformer, for galvanic isolation of the network 6. In principle, other topologies suited for feeding the network can be utilized for the DC-AC converter. The intermediate circuit serves for temporarily storing electric energy that is converted into alternating current by actuation of the semiconductor switch elements 15. The intermediate circuit may be implemented as a buffer capacitor. There may be one or several buffer capacitors.

In some plants, the buffer capacitor can be replaced by an intermediate circuit choke or be omitted altogether. FIG. 2 also shows an inverter 3 within a photovoltaic plant 1 for connection to a photovoltaic generator 2 with a direct voltage input (terminals 4 and 5) and an alternating voltage network output (terminals 7 and 8) for supplying an energy supply network 6.

In accordance with the invention, a voltage-limiting device 13 is connected downstream of the photovoltaic generator 2, said device comprising in the simplest implementation of a short-circuit switch element that is connected in parallel to the photovoltaic generator 2 and is actuatable in such a manner that, when a voltage threshold value is exceeded, this short-circuit switch element is switched to a short-circuit mode of operation and that, when the voltage falls below the voltage threshold value, it is switched off again so that the photovoltaic generator 2 quits the short-circuit mode of operation.

Figure 3:
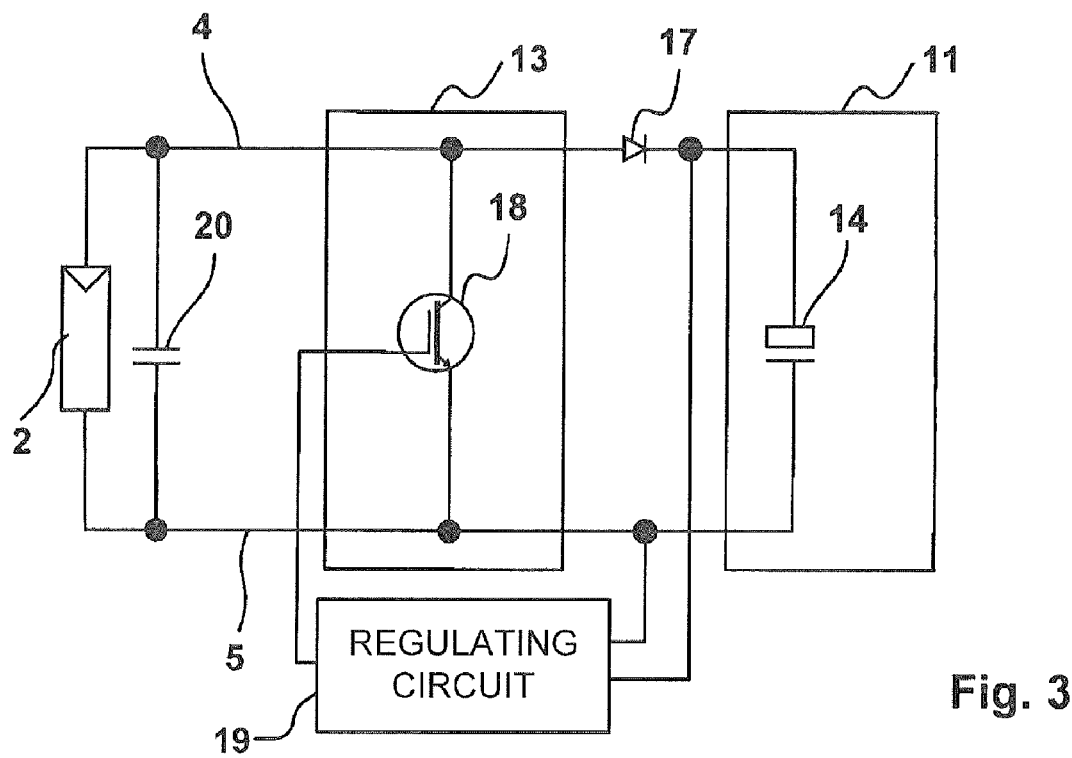
FIG. 3 shows a representation of a first variant of the solution of the invention.

FIG. 3 shows a variant with a buffer capacitor 14 in the intermediate circuit 11. This buffer capacitor 14 is connected to the photovoltaic generator 2 via a protection diode 17. A transistor, for example, a power transistor, serves as the short-circuit switch element 18. The transistor is located between the protection diode 17 and the photovoltaic generator 2. If the transistor is actuated, the voltage at the generator 2 drops. The voltage at the capacitor 14 is higher than at the generator terminals, so that the diode 17 shuts down. As a result, the buffer capacitor 14 will not be discharged upon actuation of the transistor 18.

Figure 4:
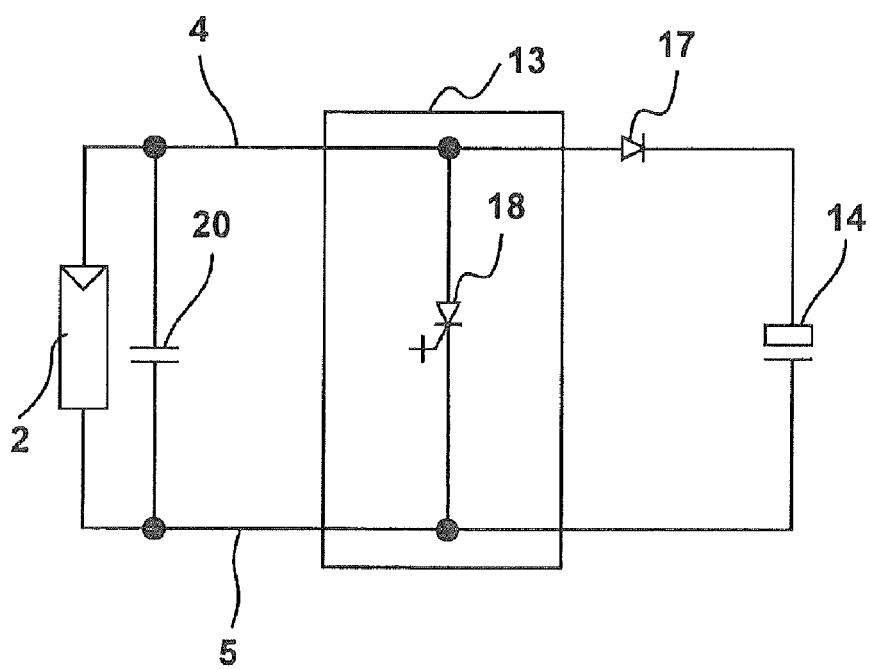
FIG. 4 shows a representation of a second variant of the solution of the invention.

In FIG. 4, the power transistor is replaced by a turn-off thyristor (GTO). In principle, a thyristor with a suited quenching circuit may be used. As contrasted to the IGBT, a thyristor or GTO is characterized by maximum energy dissipation while observing the threshold $I^2t$ value.

Figure 5:
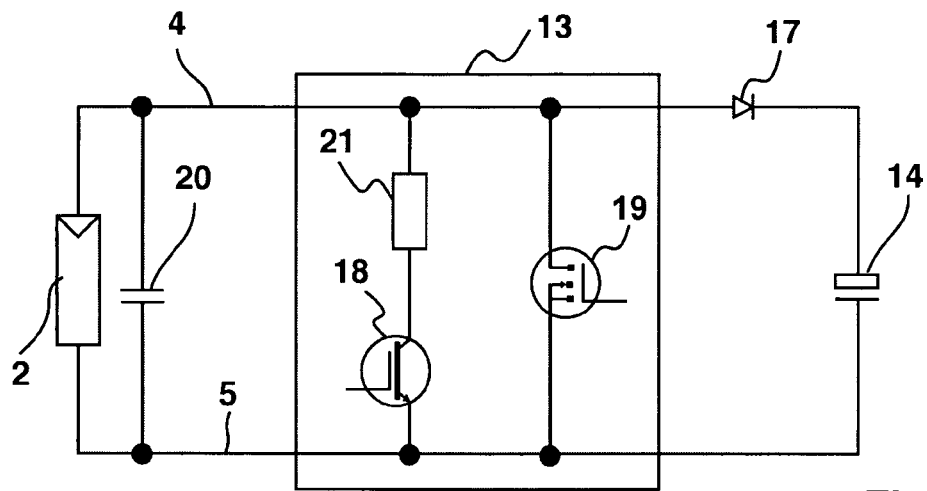
FIG. 5 shows a representation of a third variant of the solution of the invention.

As shown in the variant illustrated in FIG. 5, a load resistor 21 can be arranged in series with the short-circuit switch element 18. This load resistor allows for discharging the inner capacitance 20 of the photovoltaic generator 2 when the semiconductor switch 18 is being switched on. Thus, the energy contained in the capacitance 20 will not be converted, or not converted completely, into heat in the power switch 18. A transistor such as an IGBT or a turn-off thyristor is suited as a power switch 18.

In a particular implementation and as shown in FIG. 5, another switch 19 can be arranged in parallel to the power switch 18 and to the load resistor 21, which is connected upstream thereof. In the first step, the power switch 18 is closed and the capacitor 20 is being discharged. Once the voltage above the capacitor 20 has dropped to a low voltage, the switch 19 is switched on. This way of proceeding offers the advantage that almost the entire energy contained in the capacitance 20 is converted into heat in the resistor 21 without the latter permanently absorbing power during the short circuit.

If the switch 19 is opened, the switch element 18 must be switched off again. The power switch 18 may also be switched off immediately after the switch 19 has been connected. Since the switch 19 needs only dissipate little energy, a MOSFET, more specifically a low-impedance MOSFET, is particularly suited, as shown in FIG. 5.

Figure 6:
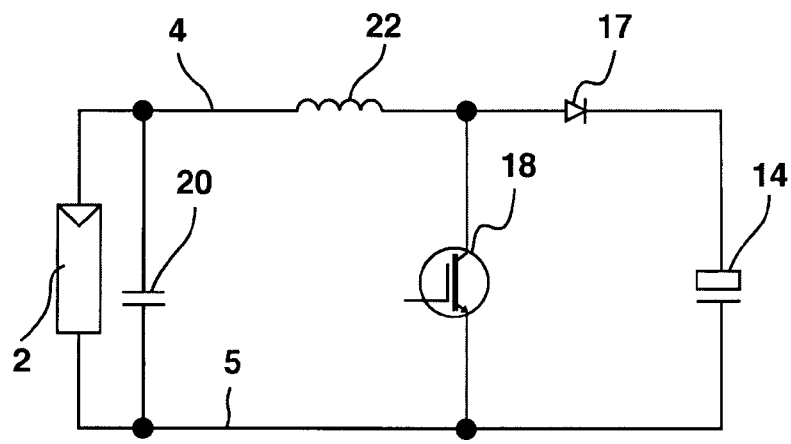
FIG. 6 shows a representation of a fourth variant of the solution of the invention.

In an alternative implementation, an inductance 22 can be connected between the photovoltaic generator 2 and the short-circuit switch element 18, as shown in FIG. 6. The inductance 22 is interposed between switch 18 and generator 2. When the switch element 18 is being switched on, the inductance 22 absorbs at least part of the energy contained in the capacitance 20.

In some solar inverters, a boost chopper is mounted upstream of the DC-AC converter 12 in order to achieve a voltage adjustment improving the efficiency. As a result, there is an inductance so that no additional inductances are utilized since the existing inductance can be utilized for the purpose described. If there is no inductance, an additional one can be added between generator 2 and switch element 18.

If a boost chopper circuit is utilized, there is no need for an additional switch element for dropping the idle voltage since the boost chopper is mounted upstream of the DC-AC converter 12 and downstream of the photovoltaic generator 2. The boost chopper is then synchronized in accordance with the method of claim 11, in order to allow for operating the photovoltaic generator 2 in the short-circuit mode of operation.

Figure 7:
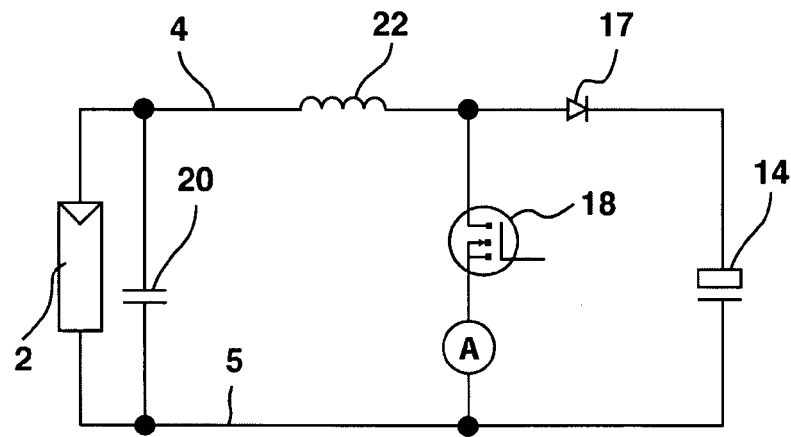
FIG. 7 shows a representation of a fifth variant of the solution of the invention.

If there is provided an inductance 22, the switch element 18 can be operated in a current-limited mode of operation, as shown in FIG. 7. For this purpose, the current is measured by the switch element 18 or by the inductance 22 and the switch element 18 is switched off when a certain current intensity, which is clearly exceeding the normal generator current, is reached. At a certain clock frequency, or after the current intensity has dropped below a given, smaller current intensity in the inductance 22, the switch element 18 is switched on again. The advantage of this solution is that the energy content of the input capacitance 20 is transferred through the boost chopper principle into the buffer capacitor 14 and needs not be converted into heat. As a result, the circuit is very tolerant with respect to the magnitude of the input capacitance.

The circuits shown are voltage limiting circuits and protection circuits for solar inverters.

In the circuits, a power switch 18 is arranged in parallel to the photovoltaic generator 2, either directly as shown in the FIGS. 1, 2, 3, 4 and 5 or through an inductance as shown in the FIGS. 6 and 7.

In the variants shown, the inverter 3 contains at least one buffer capacitor 14 and one DC-AC converter 12, the buffer capacitance 14 being connected to the semiconductor switch through a protection diode 17, in one embodiment. The power switch 18 is a semiconductor switch like a transistor or a thyristor that may be switched off or quenched in alternative embodiments.

In one embodiment the voltage is preferably measured at the buffer capacitor 14. The power switch 18 is virtually switched on when the voltage measured is high and switched off when the voltage measured is low.

The voltage threshold value of the not to be exceeded voltage is preferably less than 600 volt so that U.S. regulations can be met.

The FIGS. 2 through 7 show by way of example implementations of protection and regulating circuits for solar plants for mounting into solar inverters. The invention may however also be realized by other protection and regulating circuits. In principle, other turn-off semiconductor switch elements or suited mechanical switches for short-circuiting may also be utilized. Also, the intermediate circuit may consist of a choke rather than of a buffer capacitor.

We claim:

1. A method of operating an inverter connected to a photovoltaic generator through a boost converter with a short-circuit switch element, the method comprising:
    monitoring a voltage associated with an intermediate circuit within the inverter;
    switching the generator into a short-circuit mode by closing and maintaining closed, subject to a current-limit mode condition, the short-circuit switch element when the monitored voltage exceeds a threshold voltage; and
    switching the generator out of the short-circuit mode by opening the short-circuit switch element after the monitored voltage has dropped below the threshold voltage,
    wherein switching the generator into the short-circuit mode subject to the current-limit mode condition comprises monitoring a current in the short-circuit switch element and opening the switch if the current exceeds a predetermined limit, and subsequently closing the short-circuit switch element again.

2. An inverter, comprising:
    a DC input terminal configured to couple to a source of DC energy;
    an intermediate circuit configured to provide a temporary storage of DC energy provided by a DC voltage at the DC input terminal;
    a voltage limiting circuit coupled to the DC input terminal, and configured to generate and maintain a short-circuit condition, subject to a current-limit mode condition, at the DC input terminal when a monitored voltage associated with a DC voltage within the intermediate circuit exceeds a predetermined threshold; and
    a DC/AC converter configured to convert a DC voltage provided at the DC input terminal into an AC voltage, and provide the AC voltage to an output terminal,
    wherein the voltage limiting circuit is further configured to monitor a current therein when the short-circuit condition is generated, and temporarily suspend the short-circuit condition if the current exceeds a predetermined value.

* * * * *